US007181959B2

(12) United States Patent
Matsumoto et al.

(10) Patent No.: US 7,181,959 B2
(45) Date of Patent: Feb. 27, 2007

(54) FATIGUE FAILURE DIAGNOSTIC METHOD OF TURBOCHARGER AND FATIGUE FAILURE DIAGNOSTIC APPARATUS FOR TURBOCHARGER

(75) Inventors: Shunji Matsumoto, Fujisawa (JP); Mitsuhiro Sonohara, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/144,478

(22) Filed: Jun. 2, 2005

(65) Prior Publication Data

US 2005/0274112 A1 Dec. 15, 2005

(30) Foreign Application Priority Data

Jun. 9, 2004 (JP) ............................. 2004-171147

(51) Int. Cl.
*G01M 19/00* (2006.01)
*G01M 15/00* (2006.01)
*G01M 15/06* (2006.01)

(52) U.S. Cl. ........................ 73/118.1; 73/119 R; 73/116

(58) Field of Classification Search .................. 73/116, 73/118.1, 119 R; 60/601–602
See application file for complete search history.

(56) References Cited

U.S. PATENT DOCUMENTS 4,051,720 A 10/1977 Barrington .................. 73/116
4,334,427 A * 6/1982 Armstrong ................. 73/118.1
4,356,725 A * 11/1982 Armstrong ................. 73/118.1
6,163,254 A 12/2000 Smith et al. .................. 73/116
6,209,390 B1 4/2001 LaRue et al. ............. 73/119 R
6,889,502 B1 * 5/2005 French et al. ................. 60/601
2003/0033889 A1 2/2003 Schmid et al. ............. 73/118.1
2005/0193810 A1 * 9/2005 Gladden ................... 73/119 R

FOREIGN PATENT DOCUMENTS

JP 59007244 A * 1/1984 ................ 73/118.1
JP 03-117629 5/1991
JP 04-276131 10/1992
JP 09-112288 4/1997
JP 2001-329856 11/2001

OTHER PUBLICATIONS

European Search Report for Serial No. EP 05 01 1760 dated Sep. 19, 2005.

* cited by examiner

*Primary Examiner*—Thai-Ba Trieu
(74) *Attorney, Agent, or Firm*—McCormick, Paulding & Huber LLP

(57) ABSTRACT

A fatigue failure diagnostic method of a turbocharger in accordance with the present invention is a method for diagnosing the fatigue failure of a turbocharger (5), comprising the steps of measuring the revolution speed of the turbocharger (5), computing an accumulated fatigue value (Ft) based on the measured revolution speed, and executing the fatigue failure judgment of the turbocharger (5) by comparing the computed accumulated fatigue value (Ft) and the prescribed fatigue limit value (F1).

7 Claims, 5 Drawing Sheets

| REVOLUTION SPEED VARIATION CYCLE NUMBER, RNFt | | REVOLUTION SPEED AMPLITUDE, Lt | | | | |
|---|---|---|---|---|---|---|
| | | Lt[1] | Lt[2] | ••• | ••• | Lt[n] |
| MAXIMUM PEAK REVOLUTION SPEED, Rt | Rt[1] | RNFt[1,1] | RNFt[1,2] | ••• | ••• | ••• |
| | Rt[2] | RNFt[2,1] | RNFt[2,2] | ••• | ••• | ••• |
| | ••• | ••• | ••• | ••• | ••• | ••• |
| | ••• | ••• | ••• | ••• | ••• | ••• |
| | Rt[m] | ••• | ••• | ••• | ••• | RNFt[m,n] |

RNM

| REVOLUTION SPEED VARIATION CYCLE NUMBER, RNFt | | REVOLUTION SPEED AMPLITUDE, Lt | | | | |
|---|---|---|---|---|---|---|
| | | Lt[1] | Lt[2] | ••• | ••• | Lt[n] |
| MAXIMUM PEAK REVOLUTION SPEED, Rt | Rt[1] | RNFt[1,1] | RNFt[1,2] | ••• | ••• | ••• |
| | Rt[2] | RNFt[2,1] | RNFt[2,2] | ••• | ••• | ••• |
| | ••• | ••• | ••• | ••• | ••• | ••• |
| | ••• | ••• | ••• | ••• | ••• | ••• |
| | Rt[m] | ••• | ••• | ••• | ••• | RNFt[m,n] |

RNM

FIG. 5

FATIGUE FAILURE DIAGNOSTIC METHOD OF TURBOCHARGER AND FATIGUE FAILURE DIAGNOSTIC APPARATUS FOR TURBOCHARGER

CROSS REFERENCE TO RELATED APPLICATION

The applicants hereby claim foreign priority benefits under U.S.C. § 119 of Japanese Patent Application No. 2004-171147 filed on Jun. 9, 2004, and the content of which is herein incorporated by reference.

BACKGROUND OF THE INVENTION

1. Field of the Invention

The present invention relates to fatigue failure diagnostic method and apparatus for a turbocharger mounted on an engine.

2. Description of the Related Art

A turbocharger (supercharger) comprises a turbine connected to the exhaust gas channel of an engine and driven by the exhaust gas of the engine and a compressor connected to the intake channel of the engine and driven by the turbine. The turbine comprises a turbine wheel fixedly mounted on a rotary shaft. The compressor comprises a compressor impeller fixedly mounted on the same rotary shaft as the turbine wheel. The compressor impeller located on the same rotary shaft is rotated by rotating the turbine wheel with the exhaust gas of the engine. As a result, the compressor intakes the air and the pressure of the intake air is increased. Further, the intake air under increased pressure is supplied to the engine.

Because the compressor impeller of the turbocharger rotates at a very high speed, a comparatively large load is applied to the compressor impeller. If the compressor impeller is fractured, the fractured pieces thereof can be sucked into the engine. For this reason the replacement period of the compressor impeller is determined in advance and the compressor is replaced after each such replacement period.

With the conventional method for diagnosing the turbocharger fatigue, the degree of fatigue (in particular, LCF (Low Cycle Fatigue)) accumulated in the compressor impeller was evaluated based on the empiric rule, experiment, or analysis and the replacement period was determined based on the estimation results. For example, the estimation of fatigue was conducted based on the test data on the revolution speed of the compressor impeller that assumed the operation state of the engine.

Japanese Patent Application Laid-open No. 2001-329856 described a method for diagnosing the fatigue of a gas turbine. This method comprises the steps of measuring pressure fluctuations at the blade stage of a gas turbine compressor, conducting stress analysis by using the measured pressure fluctuation data and structure analysis model of the compressor blades and estimating the stress fluctuations in the actual operation environment of the compressor blades, comparing the stress fluctuations of the compressor blades that were thus estimated with the strength master curve under corrosive environment of the compressor blade material, evaluating the fatigue damage of the compressor blades, and determining the replacement period of the compressor blades based on the evaluated fatigue damage.

However, vehicles carrying the engines are used in a variety of different ways and the degree of fatigue accumulated in each compressor impeller can vary significantly. Therefore, the replacement period relating to all the actual operation states of the engine is difficult to determine. For example, when an engine is operated at a comparatively high altitude or with a comparatively high acceleration and deceleration frequency, the fatigue is comparatively rapidly and easily accumulated in the compressor impeller and the compressor impeller has to be replaced before the replacement period elapses. Furthermore, if the replacement period is determined to match an unnecessarily severe operation mode, the replacement is conducted before it is actually necessary, thereby increasing the cost.

SUMMARY OF THE INVENTION

The present invention was created with the foregoing in view and it is an object thereof to enable the judgment of the degree of turbocharger fatigue corresponding to the actual operation state of the engine and to evaluate the adequate replacement period of the turbocharger.

According to the first aspect of the present invention there is provided a fatigue failure diagnostic method of a turbocharger for diagnosing the fatigue failure of a turbocharger, comprising the steps of measuring the revolution speed of the turbocharger, computing an accumulated fatigue value based on the measured revolution speed, and executing the fatigue failure judgment of the turbocharger by comparing the computed accumulated fatigue value and the prescribed fatigue limit value.

With such configuration, it is possible to enable the judgment of the degree of turbocharger fatigue corresponding to the actual operation state of the engine and to evaluate the adequate replacement period of the turbocharger.

This fatigue failure diagnostic method of a turbocharger comprises a step of finding in advance the relationship between a stress amplitude at the time a stress of constant amplitude is periodically and cyclically applied to the turbocharger till it is fatigue fractured and a stress variation cycle number at this time, wherein the fatigue failure judgment is conducted each time a peak point of revolution fluctuation is judged based on the measured revolution speed, and the computation of the accumulated fatigue value comprises a step of reading the revolution speed in the peak point that was judged and substituting this revolution speed into the peak point revolution speed, a step of computing a peak point stress by using this peak point revolution speed, a step of computing the stress fluctuation width from the previous peak point by using this peak point stress and the peak point stress in the previous peak point, a step of substituting this stress fluctuation width into the stress amplitude and retrieving the stress variation cycle number corresponding to this stress amplitude from the relationship, a step of calculating a fatigue value by using the retrieved stress variation cycle number and conducting the prescribed computations, and a step of computing the accumulated fatigue value by using the calculated fatigue value and the accumulated fatigue value computed in the previous peak point.

Further, this fatigue failure diagnostic method of a turbocharger comprises a step of finding in advance the relationship between a maximum peak revolution speed at the time the revolution speed of the turbocharger is periodically and cyclically changed till the turbocharger is fatigue fractured, a revolution speed amplitude at this time, and a revolution speed variation cycle number at this time, wherein the fatigue failure judgment is conducted each time a peak point of revolution fluctuation is judged based on the measured revolution speed, and the computation of the accumulated fatigue value comprises a step of reading the revolution speed in the peak point that was judged and substituting this revolution speed into the peak point revolution speed, a step of computing the revolution speed fluctuation width from the previous peak point by using this peak point revolution speed and the peak point revolution speed in the previous peak point, a step of substituting the peak point revolution speed into the maximum peak revolution speed, substituting the computed revolution speed fluctuation width into the revolution speed amplitude, and retrieving the revolution speed variation cycle number corresponding to those maximum peak revolution speed and revolution speed amplitude from the relationship, a step of calculating a fatigue value by using the retrieved revolution speed variation cycle number and conducting the prescribed computations, and a step of computing the accumulated fatigue value by using the calculated fatigue value and the accumulated fatigue value computed in the previous peak point.

It is preferred that the calculation of the fatigue value comprise calculating the inverse number of the retrieved stress variation cycle number and taking it as the fatigue value.

It is preferred that the computation of the accumulated fatigue value comprise adding the calculated fatigue value to the accumulated fatigue value computed in the previous peak point and taking it as the accumulated fatigue value.

According to the second aspect of the present invention there is provided a fatigue failure diagnostic apparatus for a turbocharger for diagnosing the fatigue failure of a turbocharger, comprising revolution speed measurement means for measuring the revolution speed of the turbocharger, computation means for computing an accumulated fatigue value based on the revolution speed measured with the revolution speed measurement means, and judgment means for executing the fatigue failure judgment of the turbocharger by comparing the accumulated fatigue value computed with the computation means and the prescribed fatigue limit value.

With such a configuration, it is possible to enable the judgment of the degree of turbocharger fatigue to be in accordance with the actual operation state of the engine and to evaluate the adequate replacement period of the turbocharger.

This fatigue failure diagnostic apparatus for a turbocharger comprises storage means for storing the relationship between a stress amplitude at the time a stress of constant amplitude is periodically and cyclically applied to the turbocharger till it is fatigue fractured and a stress variation cycle number at this time, wherein the fatigue failure judgment is conducted each time a peak point of revolution fluctuation is judged based on the revolution speed measured with the revolution speed measurement means, and the computation means comprises peak point revolution speed substitution means for reading the revolution speed in the peak point that was judged and substituting this revolution speed into the peak point revolution speed, peak point stress computation means for computing a peak point stress by using this peak point revolution speed, stress fluctuation width computation means for computing the stress fluctuation width from the previous peak point by using this peak point stress and the peak point stress in the previous peak point, cycle number retrieval means for substituting this stress fluctuation width into the stress amplitude and retrieving the stress variation cycle number corresponding to this stress amplitude from the relationship, fatigue value calculation means for calculating the fatigue value by using the stress variation cycle number retrieved with the cycle number retrieval means and conducting the prescribed computations, and accumulated fatigue value computation means for computing the accumulated fatigue value by using the fatigue value calculated with the fatigue value calculation means and the accumulated fatigue value computed in the previous peak point.

Further, this fatigue failure diagnostic apparatus for a turbocharger comprises storage means for storing the relationship between a maximum peak revolution speed at the time the revolution speed of the turbocharger is periodically and cyclically changed till the turbocharger is fatigue fractured, a revolution speed amplitude at this time, and a revolution speed variation cycle number at this time, wherein the fatigue failure judgment is conducted each time a peak point of revolution fluctuation is judged based on the revolution speed measured with the revolution speed measurement means, and the computation means comprises peak point revolution speed substitution means for reading the revolution speed in the peak point that was judged and substituting this revolution speed into the peak point revolution speed, revolution speed fluctuation width computation means for computing the revolution speed fluctuation width from the previous peak point by using this peak point revolution speed and the peak point revolution speed in the previous peak point, cycle number retrieval means for substituting the peak point revolution speed into the maximum peak revolution speed, substituting the revolution speed fluctuation width computed with the revolution speed fluctuation width computation means in the revolution speed amplitude, and retrieving the revolution speed variation cycle number corresponding to those maximum peak revolution speed and revolution speed amplitude from the relationship, fatigue value calculation means for calculating the fatigue value by using the revolution speed variation cycle number retrieved with the cycle number retrieval means and conducting the prescribed computations, and accumulated fatigue value computation means for computing the accumulated fatigue value by using the fatigue value calculated with the fatigue value calculation means and the accumulated fatigue value computed in the previous peak point.

It is preferred that the computation of the fatigue value comprise calculating the inverse number of the retrieved stress variation cycle number and taking it as the fatigue value.

It is preferred that the computation of the accumulated fatigue value comprise adding the calculated fatigue value to the accumulated fatigue value computed in the previous peak point and taking it as the accumulated fatigue value.

It is preferred that the judgment means further comprises alarm means actuated when the fatigue failure of the turbocharger was judged to take place by the fatigue failure judgment means.

BRIEF DESCRIPTION OF THE DRAWINGS

FIG. 5 is a table having maximum peak revolution number—revolution number amplitude matrix.

DESCRIPTION OF THE PREFERRED EMBODIMENTS

A preferred embodiment of the present invention will be described hereinbelow in greater detail based on the appended drawings.

Figure 1:
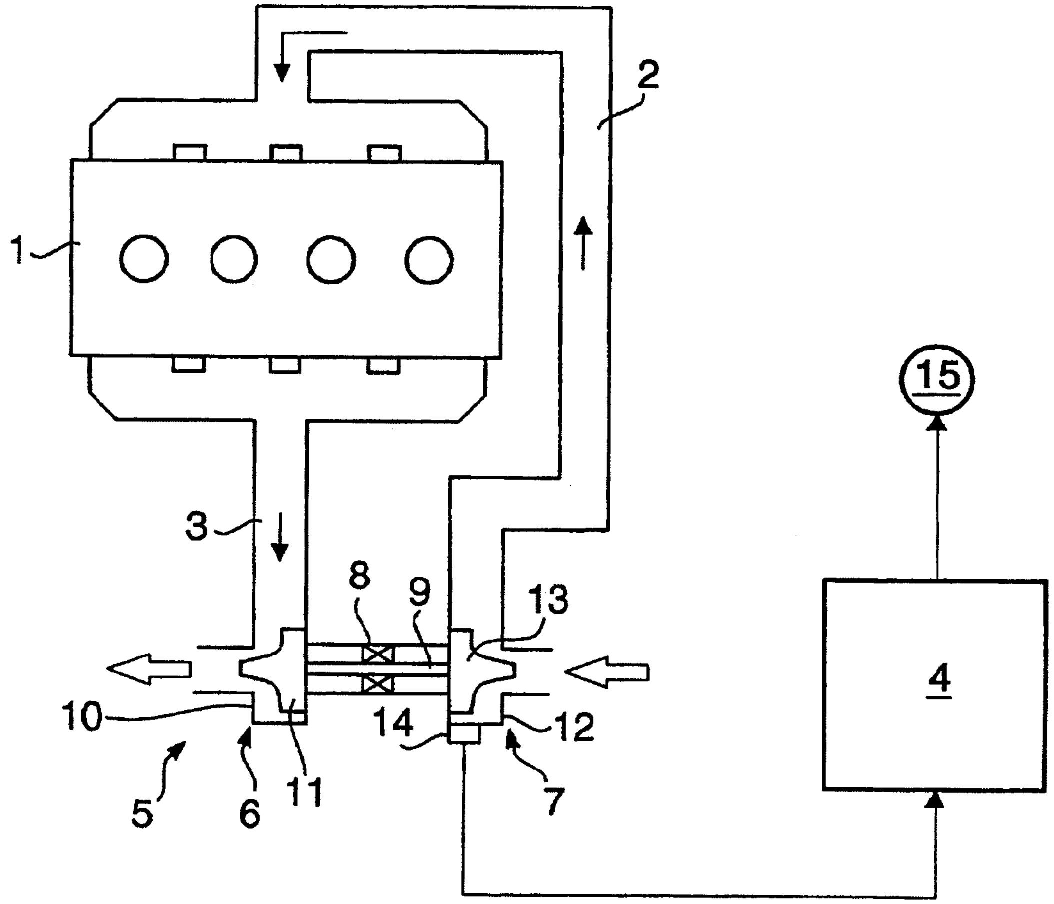
FIG. 1 is a schematic view of the engine employing the fatigue failure diagnostic apparatus for a turbocharger of the first preferred embodiment of the present invention.

FIG. 1 is a schematic view of the engine employing the fatigue failure diagnostics apparatus for a turbocharger of the first preferred embodiment of the present invention. The engine of the present embodiment is a diesel engine installed on vehicles such as trucks or cars.

In the figure, the reference numeral 1 stands for an engine body, 2—an intake channel provided in the engine body 1 and serving to pass an intake air, 3—an exhaust channel provided in the engine body 1 and serving to pass an exhaust gas, 4—a control unit (referred to hereinbelow as ECU) to which a variety of sensors and devices are connected, and 5—a turbocharger mounted on the engine body 1.

As shown in FIG. 1, the turbocharger 5 of the present embodiment comprises a turbine 6 connected to the exhaust channel 3 and driven by the exhaust gas of the engine body 1 and a compressor 7 connected to the intake channel 2 and driven by the turbine 6. A bearing 8 is provided between the turbine 6 and compressor 7. The bearing 8 rotatably supports the shaft (rotary shaft) 9.

The turbine 6 comprises a turbine housing 10 and a turbine wheel 11 provided inside the turbine housing 10 and fixed to one end section of the shaft 9. The compressor 7 comprises a compressor housing 12 and a compressor impeller 13 provided inside the compressor housing 12 and fixed to the other end section of the shaft 9. In other words, the turbine wheel 11 and compressor impeller 13 are disposed on the same shaft (shaft 9).

If the exhaust gas of the engine body 1 is supplied to the turbine wheel 11, the turbine wheel 11 is rotated. As a result, the turbine 6 is rotated. If the turbine 6 is rotated, the compressor impeller 13 disposed on the same shaft as the turbine wheel 11 is also rotated. As a result, the compressor 7 is driven.

The compressor 7 takes the air into the compressor housing 12, and the pressure of this intake air is increased inside the compressor housing 12. This air under increased pressure is supplied by the compressor 7 to the engine body 1.

The turbocharger 5 of the present embodiment comprises an apparatus for diagnosing the fatigue failure of the turbocharger 5. The fatigue failure diagnostic apparatus of the present embodiment is designed for diagnosing the fatigue failure of the compressor impeller 13.

The fatigue failure diagnostic apparatus of the present embodiment comprises revolution speed measurement means for measuring the revolution speed of the compressor impeller 13. The revolution speed measurement means of the present embodiment comprises a revolution speed sensor 14 provided in the compressor housing 12 and an ECU 4. The revolution speed sensor 14 is connected to the ECU 4, and a detection signal from the revolution speed sensor 14 is inputted in the ECU 4. In the present embodiment, the revolution speed is the number of revolutions (rotation speed) in 1 min.

The fatigue failure diagnostic apparatus of the present embodiment comprises computation means for computing the accumulated fatigue value based on the revolution speed of the compressor impeller 13 measured with the aforementioned revolution speed measurement means and judgment means for executing the fatigue failure judgment of the compressor impeller 13 by comparing the accumulated fatigue value computed by the computation means with the prescribed fatigue limit value. The ECU 4 of the present embodiment manages the computation means and judgment means. In the present embodiment, the accumulated fatigue value is a value indicating the degree of fatigue accumulated in the compressor impeller 13.

The fatigue failure diagnostic apparatus of the present embodiment comprises alarm means actuated when the judgment means makes a decision that the fatigue failure of the compressor impeller 13 took place (replacement is necessary). The actuation of the alarm means calls upon the user (for example, the operator) to replace the compressor impeller 13.

The alarm means of the present embodiment comprises an alarm lamp 15 disposed on the meter panel (not shown in the figures) of the operation room and the ECU 4. The alarm lamp 15 is connected to the ECU 4. The actuation of the alarm lamp 15 (turned off, turned on, or turned on-off) is controlled by the ECU 4. In the present embodiment, the alarm lamp 15 is turned off in the usual state and turned on and emits red light in the case of alarm.

The ECU 4 serving as storage means stores the relationship between a stress amplitude SLt at the time a stress of constant amplitude (centrifugal stress) was periodically and cyclically applied to the compressor impeller 13 till it was fatigue fractured and a stress variation cycle number SNF (till fatigue fracture) at this time. When a centrifugal stress is applied to the compressor 13, the revolution speed with a constant amplitude corresponding to this centrifugal stress is periodically and cyclically changed. The aforementioned relationship is found in advance for a location in the compressor impeller 13 where fatigue failure can be expected. Further, where there are multiple locations in the compressor impeller 13 where the fatigue failure is expected, the relationship is found in advance for each such location.

Figure 2:
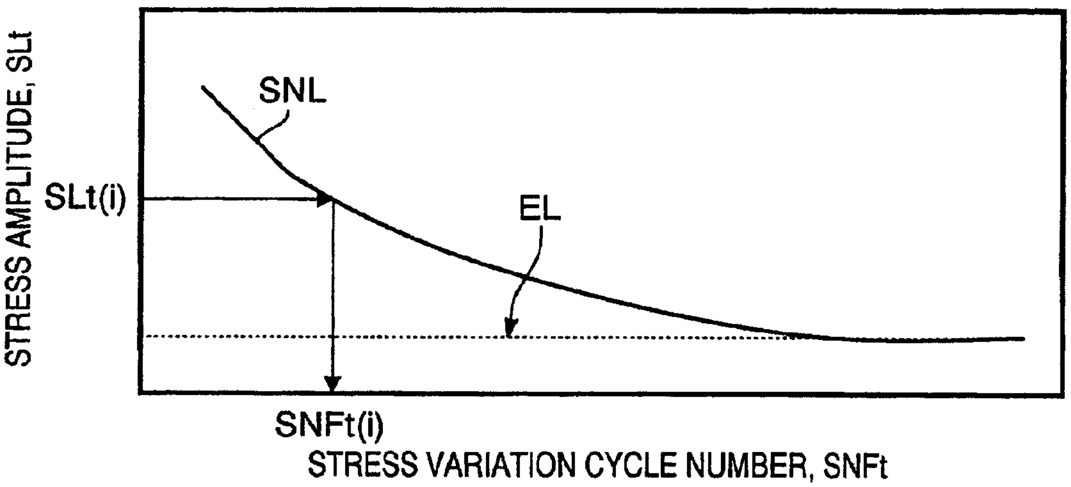
FIG. 2 is a map having a stress amplitude—stress variation cycle number line.

In the present embodiment, this relationship is represented by a stress amplitude—stress variation cycle number line SNL shown in FIG. 2. A map having the stress amplitude—stress variation cycle number line SNL is stored in the ECU 4. The stress amplitude—stress variation cycle number line SNL in the present embodiment is the so-called S-N curve (Stress-Number Curve) found experimentally or analytically. The aforementioned relationship may be also represented by a numerical formula.

In the present embodiment, the fatigue failure diagnostic of the compressor impeller 13 is conducted by the ECU 4. This diagnostic will be explained with reference to FIG. 3 and FIG. 4.

Figure 3:
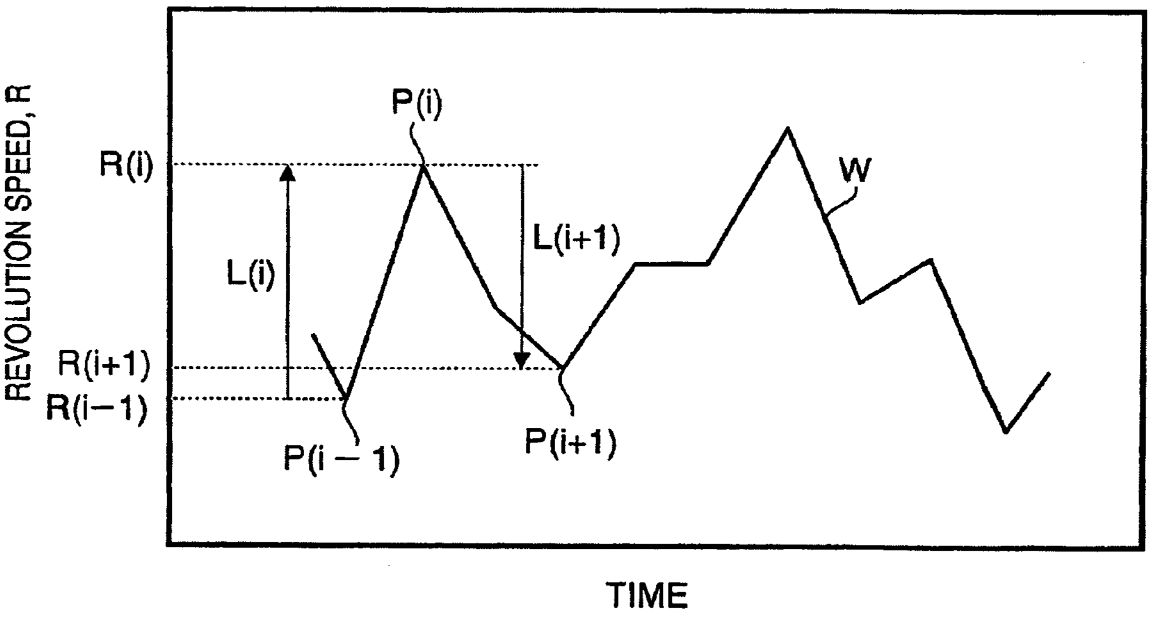
FIG. 3 is a time—revolution speed diagram representing changes in the revolution speed with time.
Figure 4:
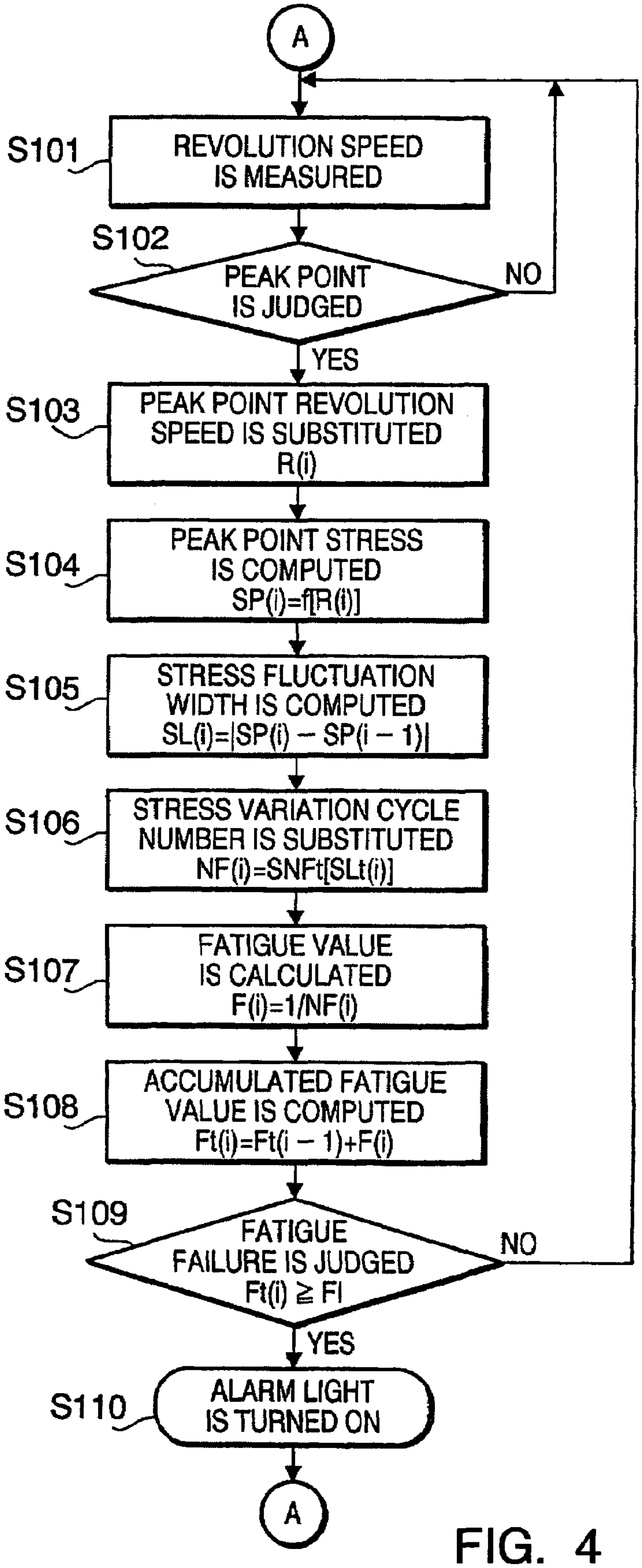
FIG. 4 is a flowchart of processing conductive with the ECU of the first embodiment.

FIG. 3 is a time—revolution speed diagram representing changes in the revolution speed with time. In FIG. 3, the waveform W is obtained by deducting components ineffective for the fatigue failure diagnostic (for example, noise or very small fluctuations of revolution speed) by filter processing from the base waveform measured with the revolution speed sensor 14. FIG. 4 is a flowchart of processing conducted by the ECU of the first embodiment.

The flow of processing conducted by the ECU 4 will be explained with reference to FIG. 4.

First, in step S101, the ECU 4 measures the revolution speed of the compressor impeller 13 by detecting the signals from the revolution speed sensor 14. In step S102, the ECU 4 judges the peak points of the revolution fluctuations based on the revolution speed measured in step S101. In the present embodiment, the fatigue failure decision is made each time a peak point of revolution fluctuation is judged based on the measured revolution speed.

In the present embodiment, the peak point (see the reference symbol P(i) etc. in FIG. 3) is a point of switching between positive and negative acceleration (point of switching between acceleration and deceleration), and the revolution fluctuation is the difference in the revolution speed between two adjacent peak points. Furthermore, in the present embodiment, when the acceleration is constant (0), it is not a peak point. Here, "i" in the reference numeral P(i) represents any cycle of revolution fluctuations (the same is true for "i" in the reference symbols below).

If the peak point is judged, in step S103, the ECU 4 reads the revolution speed in the peak point judged in step S102 and substitutes this revolution speed into the peak point revolution speed R(i).

Then, in step S104, the ECU 4 computes a peak point stress SP(i) acting upon the compressor impeller 13 by using the peak point revolution speed R(i) substituted in step S103. In the present embodiment, the computation of the peak point stress SP(i) involves the calculation of centrifugal stress based on the finite element method (FEM). Further, the relationship between the peak point revolution speed R(i) and peak point stress SP(i) corresponding thereto may be represented in the form of a graph or a numerical formula and may be stored in this form in the ECU 4.

Then, in step S105, the ECU 4 computes the stress fluctuation width SL(i) from the previous peak point by using the peak point stress SP(i) computed in step S104 and the peak point stress SP(i−1) in the previous peak point. In the computation of the stress fluctuation width SL(i), peak point stress SP(i−1) in the previous peak point is deducted from the peak point stress SP(i) and the absolute value of the result obtained is considered as the stress fluctuation width SL(i).

Then, in step S106, the ECU 4 substitutes the stress fluctuation width SL(i) computed in step S105 into the stress amplitude SLt(i) of FIG. 2, and retrieves the stress variation cycle number SNFt(i) shown in FIG. 2 and corresponding to the stress amplitude SLt(i) from the stress amplitude—stress variation cycle number SNL. For example, the stress variation cycle number SNFt is represented by $10^5$ cycles. Here, when the stress amplitude SLt is less than the fatigue limit (shown by the reference symbol EL in FIG. 2), the stress variation cycle number SNFt at this time is taken as ∞. The stress variation cycle number SNFt(i) is substituted into the number of cycles NF(i) of rotation fluctuations. Further, the retrieval from the above-described relationship (stress amplitude—stress variation cycle number SNL involves multipoint interpolation read system (for example, four-point interpolation) or gradient reading system, in addition to retrieval for each revolution fluctuation.

Then, in step S107, the ECU 4 conducts the prescribed computations by using the number of cycles NF(i) retrieved and substituted in step S106 and calculates the fatigue value F(i) of the compressor impeller 13 corresponding to the revolution fluctuation. In the present embodiment, the calculation of the fatigue value F(i) comprises calculating the inverse number of the number of cycles NF(i) and taking it as the fatigue value F(i). For example, if the number of cycles NF(i) is $10^5$, the fatigue value F(i) will be 0.00001. Here, if the number of cycles NF(i) is ∞, the fatigue value F(i) will be 0 (1/∞). Further, it is preferred that the calculation of the fatigue value F(i) be based on the high-temperature fatigue strength. For example, a temperature sensor is provided in the compressor housing 12 and the temperature compensation is conducted based on the temperature measured therewith.

Then, in step S108, the ECU 4 computes the accumulated fatigue value Ft(i) of revolution fluctuations by using the fatigue value F(i) calculated in step S107 and the accumulated fatigue value Ft(i−1) computed in the previous peak point. In the present embodiment, the fatigue value F(i) is added to the accumulated fatigue value Ft(i−1) computed in the previous peak point and the result is taken as a new accumulated fatigue value Ft(i). In other words, the fatigue value Ft(i) of the compressor impeller 13 corresponding to the revolution fluctuations is integrated according to the Miner's rule. The integration method may be not only a simple integration, but also a highly accurate rain-flow method.

Then, in step S109, the ECU 4 executes the fatigue failure judgment of the compressor impeller 13 by comparing the accumulated fatigue value Ft(i) computed in step S108 with the prescribed fatigue limit value F1. In the present embodiment, the judgment criterion of the fatigue failure is such that the fatigue failure is judged to take place when the accumulated fatigue value Ft(i) is equal to or higher than the fatigue limit value F1. If the accumulated fatigue value Ft reaches 1.0, the stress variation cycle number SNFt is apparently reached. Therefore, it is preferred that the fatigue limit value F1 be set lower than 1.0 (for example, 0.9 or 0.8).

If the fatigue failure is judged in step S109 to take place, then in step S110, the ECU 4 actuates the above-described alarm means and the user is informed that it is timely to replace the compressor impeller 13. In the present embodiment, the actuation of the alarm means comprises turning on the alarm lamp 15 with the ECU 4.

On the other hand, when the ECU 4 did not judge the peak point in step S102 or the fatigue failure was not judged to take place in step S109, the processing flow returns to step S101 and the ECU 4 again conducts the processing from step S101.

Here, when there are a plurality of locations where the fatigue damage is expected in the compressor impeller 13, the accumulated fatigue value Ft is computed for each such location and the fatigue failure judgment is executed for each location by comparing those accumulated fatigue values Ft and each fatigue limit value F1 according to the above-described procedure.

The ECU 4 of the present embodiment comprises the peak point revolution speed substitution means, peak point stress computation means, stress fluctuation width computation means, cycle number retrieval means, fatigue value calculation means, and accumulated fatigue value computation means of the claims.

The above-described fatigue failure diagnostic method of a turbocharger of the present embodiment comprises the steps of measuring the revolution speed of the turbocharger 5, computing an accumulated fatigue value Ft based on the measured revolution speed, and executing the fatigue failure judgment of the turbocharger 5 by comparing the computed accumulated fatigue value Ft and the prescribed fatigue limit value F1. In other words, in the present embodiment, the operation state of the turbocharger 5 is monitored by measuring the revolution speed of the turbocharger 5 and executing the fatigue failure diagnostic of the turbocharger 5 based thereupon. Therefore, with the present embodiment, the degree of fatigue of the turbocharger 5 corresponding to the actual operation state of the engine can be judged and the adequate replacement period of the turbocharger 5 can be evaluated.

The second embodiment will be explained below.

In the present embodiment, the sequence of fatigue failure judgment with the ECU 4 is partly different from that of the first embodiment. The fatigue failure diagnostic apparatus of this embodiment is also designed for diagnosing the fatigue failure of the compressor impeller 13.

In the present embodiment, the ECU 4 serving as storage means stores the relationship between a maximum peak revolution speed Rt at the time the revolution speed of the compressor impeller 13 was periodically and cyclically changed till the turbocharger 13 was fatigue fractured, a revolution speed amplitude Lt at this time, and a revolution speed variation cycle number RNFt at this time (till fatigue fracture). This relationship is found in advance for a location in the compressor impeller 13 where fatigue failure can be expected. Further, when there are multiple locations in the compressor impeller 13 where the fatigue failure is expected, the relationship is found in advance for each such location.

In the present embodiment, this relationship is represented by a maximum peak revolution speed—revolution speed amplitude matrix RNM shown in FIG. 5. This maximum peak revolution speed—revolution speed amplitude matrix RNM is stored in the ECU 4. The maximum peak revolution speed—revolution speed amplitude matrix RNM in the present embodiment is found experimentally or analytically. Further, in the present embodiment, the maximum peak revolution speed Rt and revolution speed amplitude Lt in the maximum peak revolution speed—revolution speed amplitude matrix RNM are partitioned into respective prescribed ranges. Those ranges can be set arbitrarily. The aforementioned relationship may be also represented by a numerical formula.

The flow of processing conducted by the ECU 4 will be explained with reference to FIG. 6.

Figure 6:
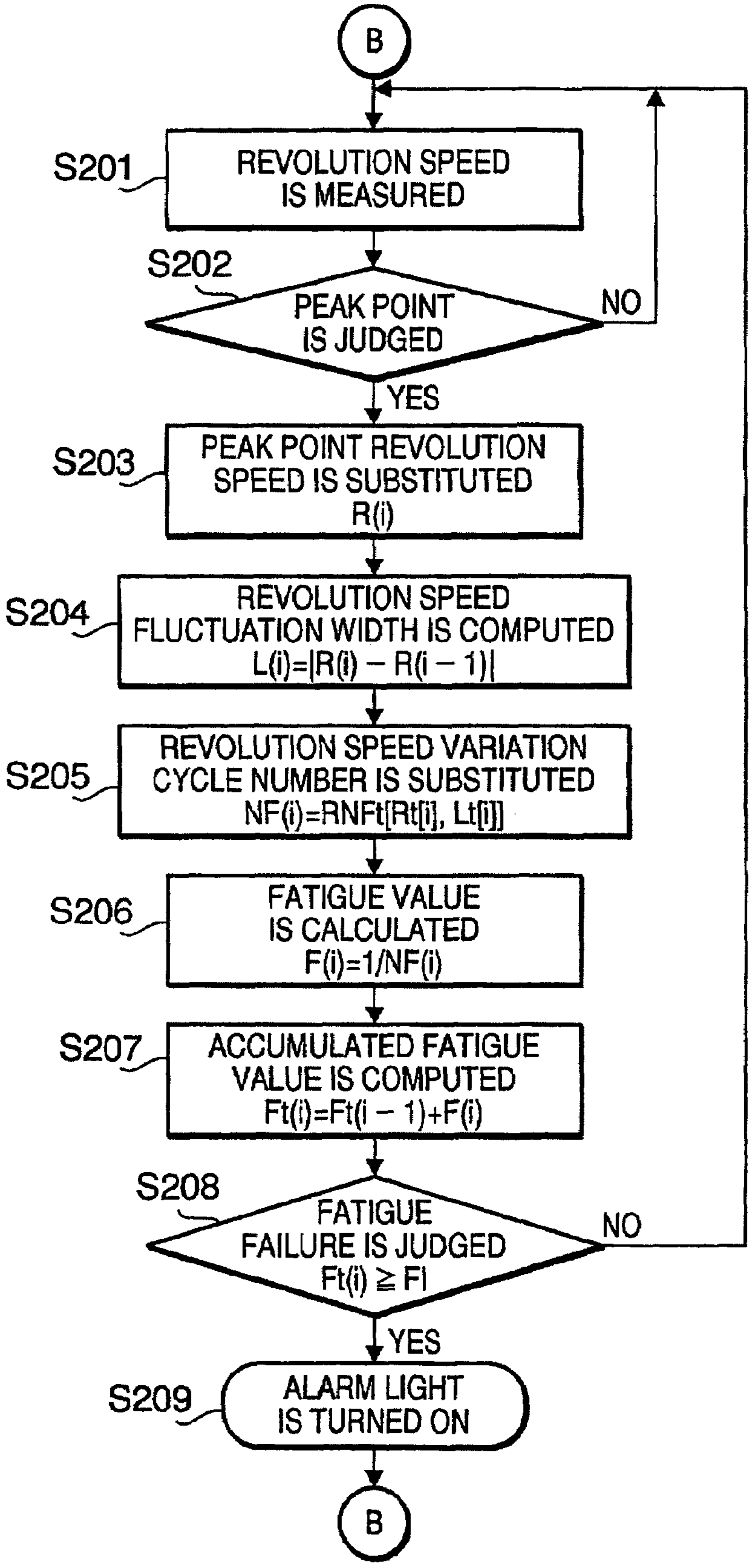
FIG. 6. is a flowchart of processing conducted with the ECU of the second embodiment.

FIG. 6 is a flowchart of processing conducted by the ECU 4 of the second embodiment.

First, in step S201, the ECU 4 measures the revolution speed of the compressor impeller 13 by detecting the signals from the revolution speed sensor 14. In step S202, the ECU 4 judges the peak points of the revolution fluctuations based on the revolution speed measured in step 201. In the present embodiment, the fatigue failure decision is made each time a peak point of revolution fluctuation is judged based on the measured revolution speed.

In the present embodiment, too, the peak point (see the reference symbol P(i) etc. in FIG. 3) is a point of switching between positive and negative acceleration (point of switching between acceleration and deceleration), and the revolution fluctuation is the difference in the revolution speed between two adjacent peak points. Furthermore, in the present embodiment, when the acceleration is constant (0), it is not a peak point.

If the peak point is judged, in step S203, the ECU 4 reads the revolution speed in the peak point judged in step S202 and substitutes this revolution speed into the peak point revolution speed R(i).

Then, in step S204, the ECU 4 computes a revolution speed fluctuation width L(i) from the previous peak point by using the peak point revolution speed R(i) substituted in step S203 and the peak point revolution speed R(i−1) in the previous peak point. The computation of the revolution speed fluctuation width L(i) is conducted by subtracting the peak point revolution speed R(i−1) in the previous peak point from the peak point revolution speed R(i) and taking the absolute value of the result as the revolution speed fluctuation width L(i).

Then, in step S205, the ECU 4 compares the peak point revolution speed R(i) substituted in step S203 with the peak point revolution speed R(i−1) in the previous peak point, substitutes the larger of the two in the maximum peak revolution speed Rt(i) shown in FIG. 5, substitutes the revolution speed fluctuation width L(i) computed in step S204 in the revolution speed amplitude Lt(i) shown in FIG. 5, and retrieves from the maximum peak revolution speed—revolution speed amplitude matrix RNM the revolution speed variation cycle number RNFt shown in FIG. 5 and corresponding to those maximum peak revolution speed Rt(i) and revolution speed amplitude Lt(i). For example, the revolution speed variation cycle number RNFt is represented by $10^5$ cycles. Here, when the amplitude of the stress (stress amplitude) acting due to combination of maximum peak revolution speed Rt and revolution speed amplitude Lt is less than the fatigue limit, the revolution speed variation cycle number RNFt at this time is represented by ∞ cycles. The revolution speed variation cycle number RNFt is substituted into the number of cycles NF(i) of rotation fluctuations. Further, the retrieval from the above-described relationship (maximum peak revolution speed—revolution speed amplitude matrix RNM) involves a multipoint interpolation read system (for example, four-point interpolation read system) or a gradient reading system, in addition to retrieval for each revolution fluctuation.

Then, in step S206, the ECU 4 conducts the prescribed computations by using the number of cycles NF(i) retrieved and substituted in step S205 and calculates the fatigue value F(i) of the compressor impeller 13 corresponding to the revolution fluctuation. In the present embodiment, the calculation of the fatigue value F(i) comprises calculating the inverse number of the number of cycles NF(i) and taking it as the fatigue value F(i). For example, if the number of cycles NF(i) is $10^5$, the fatigue value F(i) will be 0.00001. Here, if the number of cycles NF(i) is ∞, the fatigue value F(i) will be 0 (1/∞). Further, it is preferred that the calculation of the fatigue value F(i) be based on the high-temperature fatigue strength.

Then, in step S207, the ECU 4 computes the accumulated fatigue value Ft(i) of revolution fluctuations by using the fatigue value F(i) calculated in step S206 and the accumulated fatigue value Ft(i−1) computed in the previous peak point. In the present embodiment, the fatigue value F(i) is added to the accumulated fatigue value Ft(i−1) computed in the previous peak point and the result is taken as a new accumulated fatigue value Ft(i). In other words, the fatigue value Ft(i) of the compressor impeller 13 corresponding to the revolution fluctuations is integrated. The integration method may be not only a simple integration, but also a highly accurate rain-flow method.

Then, in step S208, the ECU 4 executes the fatigue failure judgment of the compressor impeller 13 by comparing the accumulated fatigue value Ft(i) computed in step S207 with the prescribed fatigue limit value F1. In the present embodiment, too, the judgment criterion of the fatigue failure is such that the fatigue failure is judged to take place when the accumulated fatigue value Ft(i) is equal to or higher than the fatigue limit value F1. If the accumulated fatigue value Ft reaches 1.0, revolution speed variation cycle number RNFt is apparently reached. Therefore, it is preferred than the fatigue limit value F1 be set lower than 1.0 (for example, 0.9 or 0.8).

If the fatigue failure is judged in step S208 to take place, then in step S209, the ECU 4 actuates the above-described alarm means and the user is informed that it is timely to replace the compressor impeller 13. In the present embodiment, the actuation of the alarm means comprises turning on the alarm lamp 15.

On the other hand, when the ECU 4 did not judge the peak point in step S202 or the fatigue failure was not judged to take place in step S208, the processing flow returns to step S201 and the ECU 4 again conducts the processing from step S201.

Here, when there are a plurality of locations where the fatigue damage is expected in the compressor impeller 13, the accumulated fatigue value Ft is computed for each such location and the fatigue failure judgment is executed for each location by comparing those accumulated fatigue value Ft and each fatigue limit value F1 according to the above-described procedure.

The ECU 4 of the present embodiment comprises the peak point revolution speed substitution means, revolution speed fluctuation width computation means, cycle number retrieval means, fatigue value calculation means, and accumulated fatigue value computation means of the claims.

With the present embodiment, the effect identical to that of the first embodiment can be obtained.

The present invention is not limited to the above-described embodiments.

For example, in the above-described embodiments, the diagnostic of fatigue failure was conducted with respect to the compressor impeller 13, but the fatigue failure diagnostic may be also conducted with respect to the shaft 9 or turbine wheel 11. In this case, the relationship between a stress amplitude at the time a stress of constant amplitude (torsional stress with respect to the shaft 9 and centrifugal stress with respect to the turbine wheel 11) was periodically and cyclically applied to the shaft 9 or turbine wheel 11 till it was fatigue fractured and a stress variation cycle number at this time, or the relationship between a maximum peak revolution speed at the time the revolution speed of the shaft 9 or turbine wheel 11 was periodically and cyclically changed till the shaft 9 or turbine wheel 11 was fatigue fractured, a revolution speed amplitude at this time, and a revolution speed variation cycle number at this time is found in advance and this relationship is stored in the ECU 4. Further, because the revolution speed of the compressor impeller 13 is equal to the revolution speed of the shaft 9 and turbine wheel 11, the revolution speed measurement means can be identical to that of the above-described embodiments.

Figure 7:
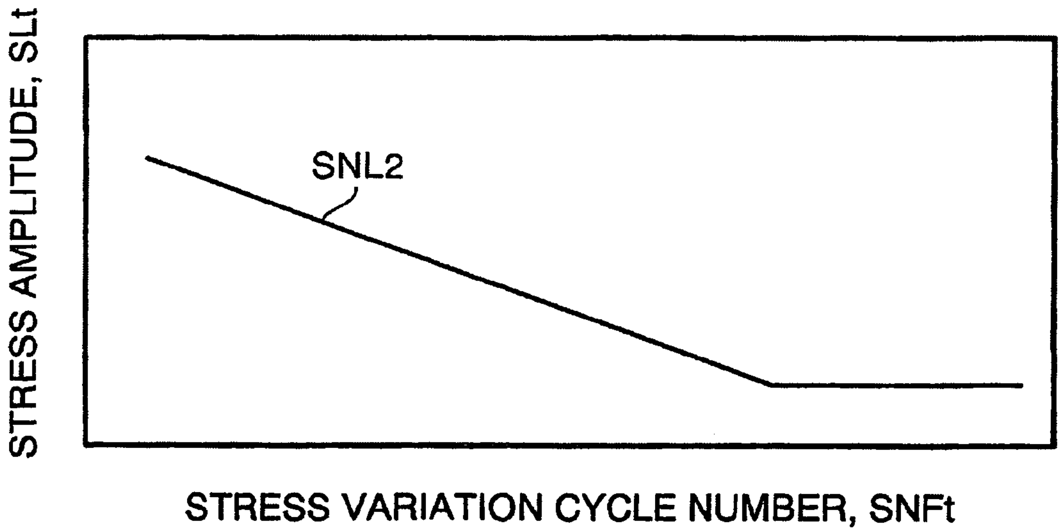
FIG. 7 is a map having a stress amplitude—stress variation cycle number line of a modification example.

Further, in the first embodiment, the relationship between a stress amplitude SLt at the time a stress of constant amplitude was periodically and cyclically applied to the compressor impeller 13 till it was fatigue fractured and a stress variation cycle number SNFt at this time may be represented by the stress amplitude—stress variation cycle number line SNL2 obtained by linear approximation, as shown in FIG. 7, of the S-N curve found by tests or analysis.

Further, the fatigue failure may be also judged by deducting the computed accumulated fatigue value Ft from the prescribed fatigue limit value F1 and judging that the fatigue failure took place when the fatigue limit value F1 becomes 0.

The alarm means may be an alarm buzzer or the like.

The aforementioned revolution speed sensor may be provided on the center housing (bearing) or turbine housing. This is because the revolution speed of the compressor impeller is equal to the revolutions peed of the shaft and turbine wheel.

The engines where the present invention can be employed are not limited to engines for vehicles and may be engines for ships or stationary power generators.

Further, the engines where the present invention can be employed are not limited to diesel engines and also may be the gasoline engines.

The fatigue failure diagnostic apparatus for a turbocharger of the present embodiments demonstrates an excellent effect of enabling the judgment of the degree of turbocharger fatigue corresponding to the actual operation state of the engine and evaluation of the adequate replacement period of the turbocharger.

"The fatigue failure diagnostic method of turbocharger and fatigue failure diagnostic apparatus for turbocharger" described and shown in the present specification, claims, and figures are described in Japanese Patent Application 2004-171147.

What is claimed is:

1. A fatigue failure diagnostic method of a turbocharger for diagnosing the fatigue failure of a turbocharger, comprising the steps of:

finding in advance the relationship between a maximum peak revolution speed at the time the revolution speed of the turbocharger is periodically and cyclically changed till the turbocharger is fatigue fractured, a revolution speed amplitude at this time, and a revolution speed variation cycle number at this time;

measuring the revolution speed of the turbocharger;

computing an accumulated fatigue value based on the measured revolution speed, the computation of the accumulated fatigue value including a step of reading the revolution speed in the peak point that was judged and substituting this revolution speed into the peak point revolution speed, a step of computing the revolution speed fluctuation width from the previous peak point by using this peak point revolution speed and the peak point revolution speed in the previous peak point, a step of substituting the peak point revolution speed into the maximum peak revolution speed, substituting the computed revolution speed fluctuation width into the revolution speed amplitude, and retrieving the revolution speed variation cycle number corresponding to those maximum peak revolution speed and revolution speed amplitude from the relationship, a step of calculating a fatigue value by using the retrieved revolution speed variation cycle number and conducting the prescribed computations, and a step of computing the accumulated fatigue value by using the calculated fatigue value and the accumulated fatigue value computed in the previous peak point; and executing the fatigue failure judgment of the turbocharger by comparing the computed accumulated fatigue value and the prescribed fatigue limit value;

wherein the fatigue failure judgement is conducted each time a peak point of revolution fluctuation is judged based on the measured revolution speed.

2. The fatigue failure diagnostic method of a turbocharger according to claim 1, wherein the calculation of the fatigue value comprises calculating the inverse number of the retrieved revolution speed variation cycle number and taking it as the fatigue value.

3. The fatigue failure diagnostic method of a turbocharger according to claim 1, wherein the computation of the accumulated fatigue value comprises adding the calculated fatigue value to the accumulated fatigue value computed in the previous peak point and taking it as the accumulated fatigue value.

4. A fatigue failure diagnostic apparatus for a turbocharger for diagnosing the fatigue failure of a turbocharger, comprising:

storage means for storing the relationship between a maximum peak revolution speed at the time the revolution speed of the turbocharger is periodically and cyclically changed till the turbocharger is fatigue fractured, a revolution speed amplitude at this time, and a revolution speed variation cycle number at this time;

revolution speed measurement means for measuring the revolution speed of the turbocharger;

computation means for computing an accumulated fatigue value based on the revolution speed measured with the revolution speed measurement means, the computation means including peak point revolution speed substitution means for reading the revolution speed in the peak point that was judged and substituting this revolution speed into the peak point revolution speed, revolution speed fluctuation width computation means for computing the revolution speed fluctuation width from the previous peak point by using this peak point revolution speed and the peak point revolution speed in the previous peak point, cycle number retrieval means for substituting the peak point revolution speed into the maximum peak revolution speed, substituting the revolution speed fluctuation width computed with the revolution speed fluctuation width computation means into the revolution speed amplitude, and retrieving the revolution speed variation cycle number corresponding to those maximum peak revolution speed and revolution speed amplitude from the relationship fatigue value calculation means for calculating the fatigue value by using the revolution speed variation cycle number retrieved with the cycle number retrieval means and conducting the prescribed computations, and accumulated fatigue value computation means for computing the accumulated fatigue value by using the fatigue value calculated with the fatigue value calculation means and the accumulated fatigue value computed in the previous peak point; and judgment means for executing the fatigue failure judgement of the turbocharger by comparing the accumulated fatigue value computed with the computation means and the prescribed fatigue limit value;

wherein the fatigue failure judgment is conducted each time a peak point of revolution fluctuation is judged based on the revolution speed measured with the revolution speed measurement means.

5. The fatigue failure diagnostic apparatus for a turbocharger according to claim 4, wherein the calculation of the fatigue value comprises calculating the inverse number of the retrieved revolution speed variation cycle number and taking it as the fatigue value.

6. The fatigue failure diagnostic apparatus for a turbocharger according to claim 4, wherein the computation of the accumulated fatigue value comprises adding the calculated fatigue value to the accumulated fatigue value computed in the previous peak point and taking it as the accumulated fatigue value.

7. The fatigue failure diagnostic apparatus for a turbocharger according to claim 4, wherein the judgement means further comprises alarm means actuated when the fatigue failure of the turbocharger was judged to take place.

* * * * *